United States Patent [19]
Meier

[11] 4,141,478
[45] Feb. 27, 1979

[54] SLIDE PLATE ASSEMBLY

[75] Inventor: Ernst Meier, Kilchberg, Switzerland

[73] Assignee: Stopinc Aktiengesellschaft, Zug, Switzerland

[21] Appl. No.: 793,858

[22] Filed: May 4, 1977

[30] Foreign Application Priority Data

May 8, 1976 [DE] Fed. Rep. of Germany ....... 2620423

[51] Int. Cl.² .............................................. B22D 41/08
[52] U.S. Cl. .................................... 222/600; 222/603; 251/326
[58] Field of Search ................... 251/326; 137/329.01; 222/600, 561, 603; 266/220

[56] References Cited
U.S. PATENT DOCUMENTS

| 506,328 | 10/1893 | Morris | 222/600 |
|---|---|---|---|
| 1,611,844 | 12/1926 | Wilson | 251/326 |
| 3,866,806 | 2/1975 | Shapland, Jr. | 222/600 |

FOREIGN PATENT DOCUMENTS 2330113  1/1975  Fed. Rep. of Germany .......... 222/600

Primary Examiner—David A. Scherbel
Attorney, Agent, or Firm—Wenderoth, Lind & Ponack

[57] ABSTRACT

A slide plate assembly includes a refractory slide plate having a through-flow opening therethrough and embraced within and supported by a slide plate operating frame. The frame includes a main frame member having a side and opposite ends and a side member. The side member is removably attached to the opposite ends of the main frame member in a manner such that it is movable toward and away from an adjacent portion of the periphery of the slide plate. The inner surfaces of the side of the main frame member and the side member are non-parallel and divergent such that the slide plate is grasped from three areas by forces which converge generally toward the through-flow opening through the slide plate.

14 Claims, 5 Drawing Figures

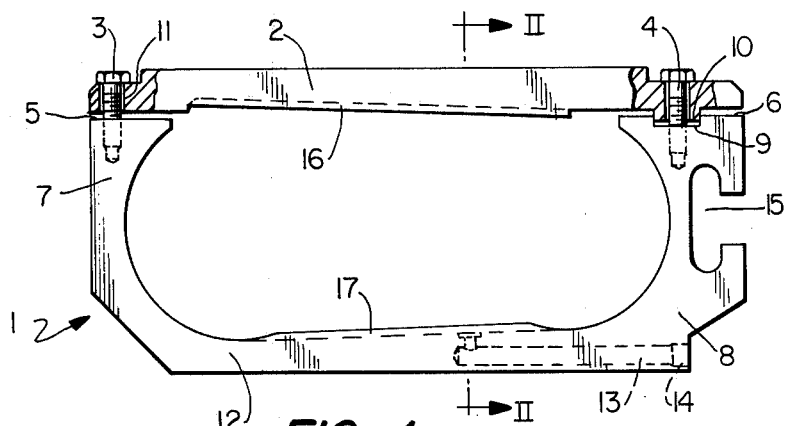
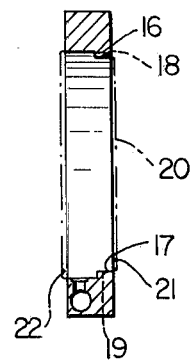
FIG. 1  FIG. 2
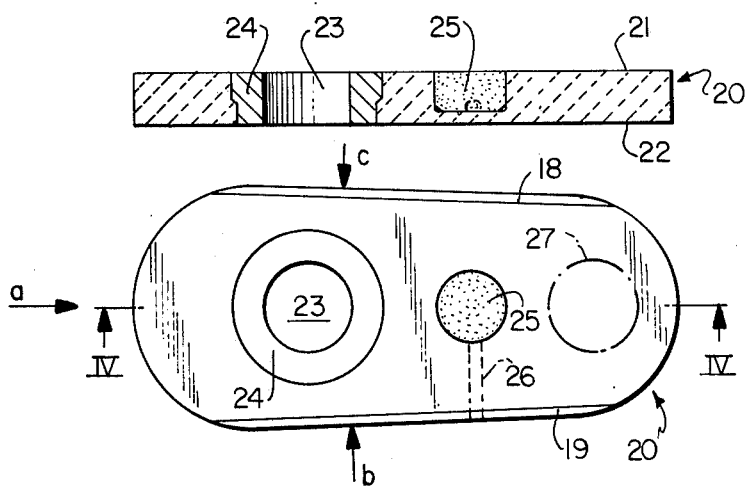
FIG. 4  FIG. 3
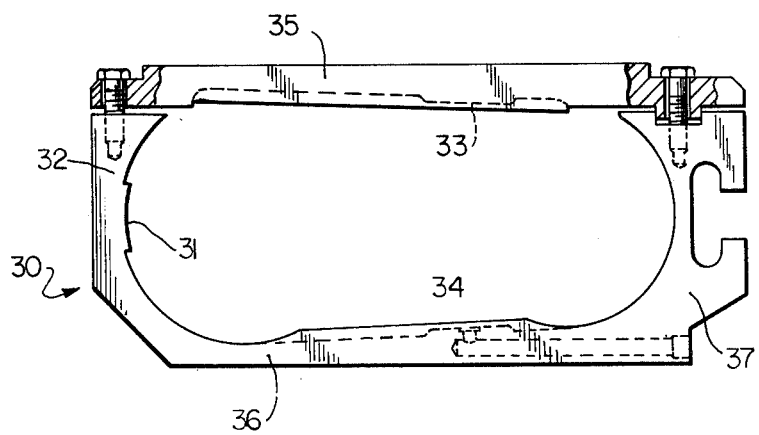
FIG. 5

SLIDE PLATE ASSEMBLY

BACKGROUND OF THE INVENTION

The present invention relates to a slide plate assembly or slide plate-frame unit including a slide plate having a through-flow opening surrounded by a frame. The frame and slide plate supported thereby are particularly usable between the hole plate and spout plate of a three-plate slide closure for use in opening or closing a spout plate pouring opening in a metallurgical vessel.

It is known that the connection between the slide plate and operating frame of a slide plate assembly presents certain operational problems. That is, on the one hand it is necessary that the plate and frame be rigid with respect to each other during operation. On the other hand however, it is also important that the slide plate be readily and easily removable from the frame so that a new slide plate may be assembled to the frame. Additionally, it is necessary that the frame be of a configuration to absorb and compensate for dimensional tolerances, particularly in the peripheral dimension of the slide plate.

In a slide closure as disclosed in German Pat. No. 1,743,172, the slide plate is held firmly in the operating frame by means of mortar. However, the use of mortar to fixedly position the slide plate within the frame is disadvantageous in that the mortar is likely to crumble during use, such that play between the slide plate and frame results. Such play promotes the formation of cracks in the slide plate during further use of the assembly.

SUMMARY OF THE INVENTION

With the above discussion in mind, it is the primary object of the present invention to provide a novel slide plate assembly which obviates the above disadvantages.

It is a further object of the present invention to provide an improved slide plate assembly having a mortar-free connection between the slide plate and operating frame.

It is an even further object of the present invention to provide such a slide plate assembly whereby a rigid connection between the slide plate and operating frame is assured, while at the same time enabling the slide plate to be rapidly and easily removed from the operating frame.

The above objects are achieved in accordance with the present invention by providing that the operating frame includes at least one frame section or member which is removable and which is movable toward and away from the periphery of the slide plate. The frame includes a main frame member and the removable member, in the form of a side member, which are clamped to each other in such a manner to compensate for dimensional tolerances and in such a manner that the pressure exerted by the frame on the peripheral surfaces of the slide plate is adjustable. No mortar whatsoever is used between the slide plate and frame, and thus the assembly and disassembly of the slide plate to the frame are greatly simplified.

In accordance with a particularly advantageous feature of the present invention, the inner surfaces of the longitudinal sides of the frame and the outer surfaces of the longitudinal sides of the slide plate diverge from respective first ends thereof outwardly toward respective second ends thereof, such that the slide plate has relatively smaller and larger ends. The through-flow opening is located in the larger end of the slide plate. In this manner, the frame grasps the slide plate from three general directions generally surrounding the larger end thereof and converging generally toward the through-flow opening. This location and concentration of grasping forces tend to counteract the possible formation of cracks that might tend to appear on the edge of the through-flow opening. This manner of three-directional grasping also tends to completely eliminate and prevent relative movement of the slide plate within the frame, even when the pressure exerted by the frame on the slide plate is relatively low.

In view of the fact that the grasping of the slide plate by the frame occurs at the larger end of the slide plate, the smaller end of the slide plate is not substantially grasped. Thus, relative expansion between the slide plate and frame is allowed at the smaller end of the slide plate.

The removable portion of the frame is preferably a longitudinal side member which is easily and quickly removable from the main frame member and is attached thereto by means of screws or bolts. Preferably, a first end of the side member is fixedly and immovably attached to the main frame member, for example by means of a tight fitting tongue and groove connection therebetween. Further preferably, the opposite end of the longitudinal side member is attached to the main frame member in a manner to allow relative expansion therebetween. This may be achieved in accordance with a specific embodiment of the present invention by means of a bolt connection extending through the side member and threaded into the main frame member, with a clearance being provided between the bolt and the side member.

In accordance with a further feature of the present invention, the inner surface of the longitudinal side of the main frame member and the inner surface of the longitudinal side member have extending inwardly therefrom longitudinal projections which fit within correspondingly dimensioned longitudinal recesses in the opposite side surfaces of the slide plate.

The slide plate is conveniently made thicker than the frame such that the opposite flat surfaces of the slide plate extend beyond the adjacent upper and lower surfaces of the frame.

In accordance with a still further feature of the present invention, the refractory slide plate has therein a gas porous member located at a closing position of the slide plate, i.e., at a position whereat the porous member would confront a pouring opening when the slide plate assembly is moved from the opening position to the closing position. Ducts extend through the frame and the slide plate into the porous member so that gas may be supplied to the melt to prevent freezing thereof or to provide a metallurgical treatment thereof. Even further, the slide plate has a further safety closing area provided to confront the spout pouring opening when the slide plate assembly is moved to a further closing position.

BRIEF DESCRIPTION OF THE DRAWINGS

Other objects, features and advantages of the present invention will be apparent from the following detailed description, with reference to the accompanying drawings, wherein:

FIG. 1 is a plan view, with portions thereof broken away, of a first embodiment of a slide plate operating frame in accordance with the present invention;

FIG. 2 is a cross-sectional view taken along line II—II of FIG. 1, but with a slide plate shown by phantom lines assembled to the frame;

FIG. 3 is a plan view of a slide plate in accordance with the present invention;

FIG. 4 is a cross-sectional view taken along line IV—IV of FIG. 3; and

FIG. 5 is a view similar to FIG. 1, but of a second embodiment of a slide plate operating frame in accordance with the present invention.

DETAILED DESCRIPTION OF THE INVENTION

With reference now to FIGS. 1 and 2 of the drawings, a slide plate operating frame 1 in accordance with the present invention includes an integral main frame member including a longitudinal side 12 and transverse ends 7 and 8. The frame 1 also includes a removable longitudinal side member 2 which is attached, for example by means of screws or bolts 3 and 4, to sectioned laterally facing surfaces 5 and 6 of ends 7 and 8, respectively.

The configuration of the central opening formed in the frame 1 to support therein a slide plate 20 is elongated. The inner surfaces of side 12 and side member 2 which define the opening which receives the slide plate are non-parallel and diverge from a first end of the opening, i.e., the right end shown in FIG. 1, outwardly toward the left end of the opening as shown in FIG. 1.

One end of side member 2, preferably that end adjacent the smaller end of the opening, is rigidly fixed or locked to surface 6 by means such as a slot 9 formed in surface 6 and into which fits in a tight manner a tongue 10 formed in side member 2. Thus, when the slide plate is fixed within the frame, there will be no relative longitudinal movement between the end 8 of the frame member and the right-hand end of side member 2 caused by relative thermal expansions of the respective members during use of the slide plate-frame unit. It is to be understood that the groove could be in side member 2 and the tongue could be in surface 6. It is further to be understood that a fixed connection between end 8 and the adjacent side member end could be provided by other known expedients.

However, relative expansion is allowed between the opposite end of side member 2 and the respective end 7 of the plate member. In the illustrated embodiment, relative expansion is allowed by the provision of an expansion clearance 11 surrounding the stem of bolt 3. Alternatively, such relative expansion could be allowed for by providing a hinge-type connection between end 7 of the frame member and the respective end of side member 2. Accordingly, during use of the overall unit, the two members of the frame are allowed to expand relative to each other.

Side 12 and side member 2 have therealong longitudinal strip-shaped inward projections 17 and 16, respectively, that are flush with the upper flat surface of the frame 1.

With reference to FIGS. 2-4 of the drawings, a slide plate 20 is formed of a refractory material in a known manner and has a configuration to fit within the opening described above within frame 1. The longitudinal sides of slide plate 20 are provided with recesses 18 and 19 which are adapted to engage in a mating manner with projections 16 and 17, respectively, of the frame. This is particularly shown in FIG. 2 of the drawings.

Slide plate 20 has therethrough a conventional through-flow opening 23 defined by a sleeve 24 which is conventionally formed of a material which is more resistant to wear than the material forming slide plate 20. When the slide plate-frame unit is in the open position during use, opening 23 is coaxially aligned with openings in a bottom plate and a spout plate in a conventional manner, such that molten material may be removed from a suitable vessel.

Preferably, opening 23 through slide plate 20 is formed in the larger end, i.e., the left-hand end as shown in FIG. 3. When the frame is assembled with slide plate 20 fitted within the opening thereof, the tightening pressure of bolts 3 and 4 will cause tightening pressure to be exerted by the frame 1 against the slide plate 20 along three areas tending to hold the slide plate 20 within the frame. Specifically, a first force a will be directed against the larger end of slide plate 20 by means of end 7 of the slide plate. Also, a force b will be directed against the slide plate 20 by side 12 in a direction perpendicular to the inner surface of side 12 and the adjacent contacted surface of the slide plate. A similar force c will be directed against the other longitudinal surface of slide plate 20, in a direction perpendicular thereto, by the inner surface of side member 2. Due to the non-parallel alignment of the longitudinal sides of slide plate 20, and the adjacent contacting surfaces of the frame 1, forces b and c will not be transverse to the frame as a whole, but will generally be directed in directions perpendicular to the longitudinal surfaces of slide plate 20. Thus, the three forces a, b and c will generally be directed toward and converge upon opening 23. Thus, the tightening forces of frame 1 against slide plate 20 tend to counteract any possible formation of cracks that might occur around opening 23 during use thereof. Furthermore, the provision of the tightening forces converging adjacent the larger end of the slide plate which has therein the opening 23, substantially avoids the application of any tightening forces against the opposite end of the slide plate. This allows the smaller end of the slide plate to be substantially free of positive gripping forces, whereby this end of the slide plate is allowed to freely expand during use as a result of thermal deformation.

In accordance with a further feature of the present invention, the slide plate 20 has, adjacent opening 23, a closed position defined by gas permeable element 25, whereat, when the slide plate-frame unit is moved in use to be out of alignment with the spout plate opening, porous element 25 is aligned with the spout plate opening. A gas may be supplied to the molten material in contact with the top of porous element 25, via a duct 26 through slide plate 20 communicating with a duct 13 through side 12 of frame 1. Duct 13 is threaded as at 14 to be coupled to a gas source connection. Thus, when the slide plate-frame unit is moved to the closed position such that porous element 25 aligns with a spout plate opening, gas supplied through ducts 13 and 26 into porous member 25 will pass therethrough to prevent freezing of the molten material when the unit is in the closed position. Also, gas may be supplied through ducts 13 and 26 and porous member 25 for the purpose of a desired and conventional metallurgical treatment of the melt.

In even further accordance with the present invention, the slide plate 20 includes a third area which may be aligned with the spout plate opening when the slide plate-frame unit is moved even further in the closed position during use of the unit. Thus, the area 27 provided on slide plate 20 may be employed to close the spout plate opening during periods of difficulty in supplying gas through ducts 13 and 26 and porous member 25.

As shown in FIG. 2, slide plate 20 is thicker than frame 1, such that when the slide plate is clamped within the frame the opposite parallel surfaces of slide plate 20 extend beyond the opposite surfaces of the frame. This is shown by the phantom lines in FIG. 2 of the drawings.

Further, as shown in FIG. 1 of the drawings, the frame 1, at end 8 thereof, includes a hook 15 which may be engaged in a conventional manner by an operating rod during use of the unit to achieve movement of the assembled frame and slide plate.

With reference now to FIG. 5 of the drawings, a modified embodiment of the frame in accordance with the present invention will be described. The frame 30 in this embodiment is identical to the frame shown in FIG. 1, with the exception that when the slide plate is assembled therein it is not contacted around the entire periphery thereof by the frame. Rather, in accordance with the embodiment of FIG. 5, end 32 has on the interior surface thereof a projection 31 which contacts the slide plate. Similarly, longitudinal side 36 of frame 30 has a projection 34 which contacts the slide plate, and side member 35 has on the interior surface thereof a projection 33 which contacts the slide plate. It will be apparent that the three projections 31, 33 and 34 of the embodiment of FIG. 5 cooperate to provide a three point or directional support and clamping of the slide plate and that the forces exerted by projections 31, 33 and 34 tend to converge toward the wider end of the slide plate which has therein opening 23. Thus, in this embodiment the tightening or clamping forces exerted on the slide plate by the frame tend to converge in the area of the opening.

It will be apparent that in both embodiments of the frame described above the slide plate can be precisely fastened and grasped from the converging areas, i.e., areas 2, 7 and 12 in the embodiment of FIG. 1 and areas 33, 31 and 34 of the embodiment of FIG. 5. The sides 8 and 37 in the embodiments of FIGS. 1 and 5, respectively, do not actively participate in the clamping or grasping of the slide plate. Rather, ends 8 and 37 loosely surround the smaller end of the slide plate, with play therebetween, to absorb longitudinal tolerances and expansion as a result of thermal deformation during use of the unit.

It is to be understood that the slide plate assembly of the present invention, including the frame 1 or 30 and the slide plate 20, is assembled during use in a conventional and known slide closure. Such slide closure may be of the known two-plate type or of the known three-plate type. The other elements of the slide closure and the metallurgical vessel have not been illustrated or described in the present application for purposes of simplicity of explanation, and in view of the fact that such non-illustrated elements do not form the present invention and are well known and understood by those skilled in the art.

It will further be understood that various modifications may be made to the above specifically described structural arrangements without departing from the scope of the present invention.

What is claimed is:

1. A slide plate assembly, particularly for use in a slide closure for closing and opening a spout plate pouring opening in a metallurgical vessel, said assembly comprising:
 a slide plate having a through-flow opening therein; and
 a slide plate operating frame embracing the periphery of said slide plate, said frame including a main frame member having a side and opposite ends and a removable side member attached to said main frame member and movable toward and away from an adjacent portion of said periphery of said slide plate, inner surfaces of said ends, said side and said side member defining therebetween a slide plate receiving opening, said inner surfaces of said side and said side member being non-parallel and diverging outwardly from a first said end to a second said end.

2. An assembly as claimed in claim 1, further comprising attachment means for attaching opposite ends of said side member to surfaces of adjacent said ends.

3. An assembly as claimed in claim 2, wherein said attachment means comprise means for fixedly and immovably attaching a first end of said side member to a first said end of said main frame member, and means for attaching a second end of said side member to a second end of said main frame member with play therebetween sufficient to allow for expansion in a direction generally longitudinal of said side and said side member during use of the assembly.

4. An assembly as claimed in claim 1, wherein opposite side surfaces of said slide plate are non-parallel and diverge outwardly from a first end thereof to a second end thereof, said side surfaces being parallel to adjacent inner surfaces of said side and side member.

5. An assembly as claimed in claim 4, wherein said through-flow opening is located adjacent said second end of said slide plate.

6. An assembly as claimed in claim 5, further comprising a gas porous member in said slide plate at a position between said through-flow opening and said first end of said slide plate.

7. An assembly as claimed in claim 6, further comprising duct means for supplying gas through said frame and said slide plate to said porous member.

8. An assembly as claimed in claim 6, further comprising a safety closing area positioned adjacent said first end of said slide plate, said safety closing area being of a size large enough to block the pouring opening of the metallurgical vessel.

9. An assembly as claimed in claim 4, wherein said inner surfaces of said second end and said side of said main frame member and said inner surface of said side member contact and grasp the peripheral surface of said second end and said side surfaces of said slide plate.

10. An assembly as claimed in claim 4, wherein said inner surfaces of said second end and said side of said main frame member and said inner surface of said side member have extending inwardly therefrom projections which contact and grasp the peripheral surface of said second end and said side surfaces of said slide plate.

11. An assembly as claimed in claim 4, wherein said inner surfaces of said side and said side member have extending inwardly therefrom elongated projections, and said side surfaces of said slide plate have therein elongated recesses, said projections fitting in said recesses.

12. A slide plate assembly, particularly for use in a slide closure for closing and opening a spout plate pouring opening in a metallurgical vessel, said assembly comprising:

a slide plate having a through-flow opening therein;

a slide plate operating frame embracing the periphery of said slide plate, said frame including a main frame member having a side and opposite ends and a removable side member attached to said main frame member and movable toward and away from an adjacent portion of said periphery of said side plate; and attachment means for attaching opposite ends of said side member to surfaces of adjacent said ends, said attachment means comprising means for fixedly and immovably attaching a first end of said side member to a first said end of said main frame member, and means for attaching a second end of said side member to a second end of said main frame member with play therebetween sufficient to allow for expansion in a direction generally longitudinal of said side and said side member during use of the assembly.

13. An assembly as claimed in claim 12, wherein said fixedly and immovably attaching means comprises a groove formed in one of said first end of said side member and said first end of said main frame member, a tongue extending outwardly from the other of said first end of said side member and said first end of said main frame member, said tongue being tightly received in said groove, and bolt means extending through said side member into said first end of said main frame member.

14. An assembly as claimed in claim 12, wherein said means for attaching with play comprises bolt means extending through said second end of said side member into said second end of said main frame member, said bolt means and said second end of said side member having sufficient clearance therebetween to allow for relative expansion movement therebetween.

* * * * *